United States Patent Office 3,391,920
Patented July 9, 1968

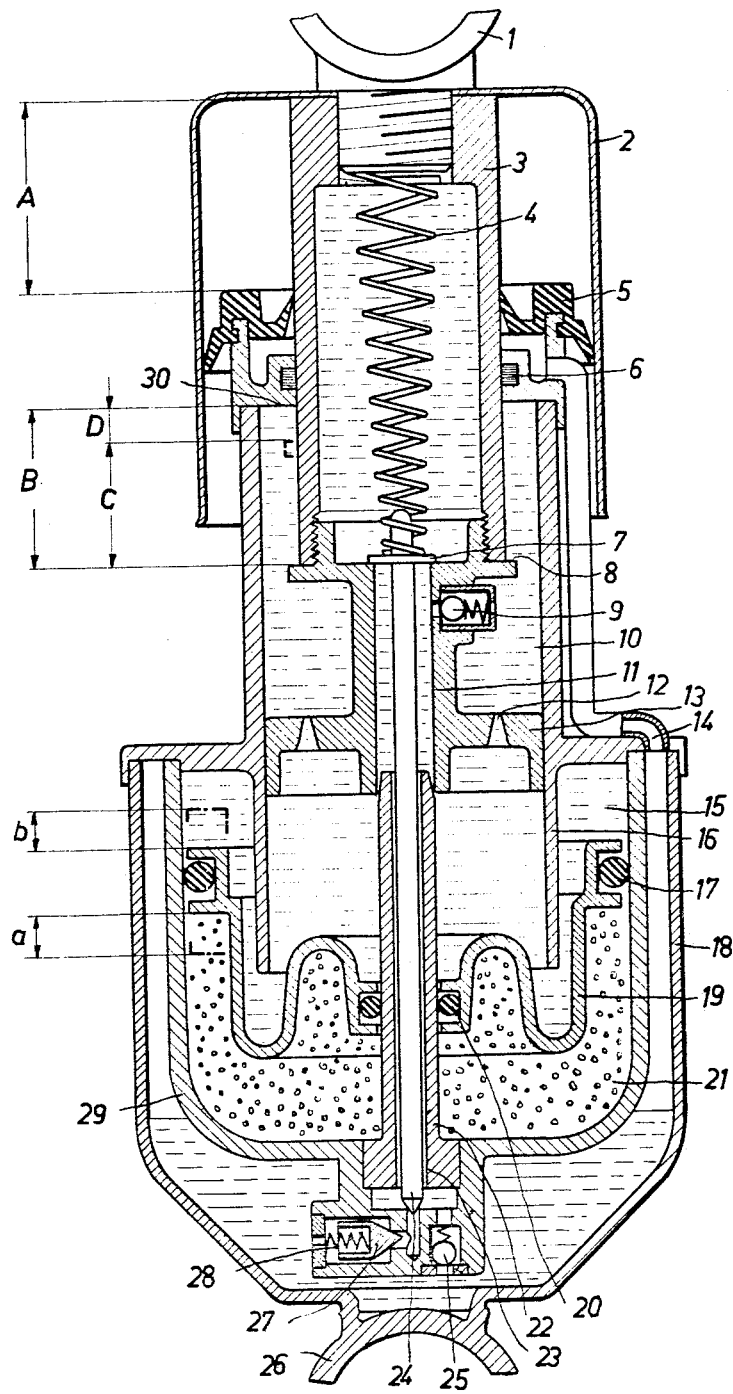

3,391,920
HYDRAULIC SHOCK ABSORBER WITH AUTOMATIC REPOSITIONING MEANS AND GAS CUSHION
Leopold F. Schmid, Pischekstrasse 49, Stuttgart, Germany
Filed Dec. 2, 1965, Ser. No. 511,038
Claims priority, application Germany, Dec. 2, 1964, Sch 36,201
5 Claims. (Cl. 267—64)

ABSTRACT OF THE DISCLOSURE

Hydraulic shock absorber with a dashpot assembly whose piston has a tubular stem for operating with a plunger to pump added fluid into the dashpot cylinder when the shock absorber is loaded beyond a normal limit, the cylinder including a gas cushion bounded by a slidable partition of undulating configuration.

My present invention relates to a hydraulic shock absorber with automatic repositioning means and gas cushion and, more particularly, to a system of this type in which the effectiveness of the gas cushion is vastly improved by comparison with earlier devices.

Various shock absorbers with automatic means for repositioning a pair of movable parts, e.g. the chassis and the axle assembly of a vehicular suspension, to "level" or re-establish the height of the chassis at a predetermined location have already been proposed and, indeed, such systems are described in my copending application Ser. No. 508,517 filed Nov. 18, 1965 and my concurrently filed application Ser. No. 511,039. In such systems, a gas cushion is provided to act in aiding relationship with, for example, a coil spring surrounding the shock absorber to urge the chassis upwardly with respect to the axle assembly and thus to act in aiding relationship with the pump means for re-establishing the chassis level. In prior devices using a gas cushion, it has been found that the effectiveness of this cushion was sharply limited by the volume of the gas which could be compressed within the shock absorber and thus such gas cushions were of limited utility. To overcome this disadvantage, some prior-art systems have made use of pressure accumulators connected with a pumping device or the like by suitable ducts or supplied with pressure from a remote source. In general, these systems required relatively complex control devices as well as fluid-supply and fluid-storage arrangements which could not be self-contained within the shock absorber and thus were prone to damage or were otherwise unsatisfactory.

It is, therefore, an important object of the present invention to provide an improved shock-absorber assembly for an automotive vehicle in which the effectiveness of the gas cushion is improved and in which the gas cushion can be used at least as a partial substitute for the spring means hitherto required for biasing the telescopingly interchangeable parts of the shock absorber away from one another.

A further object of this invention is to provide a relatively compact shock absorber whose gas cushion requires no auxiliary source of compression and is effective in aiding relationship to the pump assembly of the shock absorber in re-establishing the original spacing of the parts of the suspension and thus the level of the chassis.

Still another object of this invention is to provide an improved system of relatively simple construction and easily controllable for the damping of the oscillations of a vehicular suspension system.

It has been recognized in connection with suspension systems that the provision of a gas spring or cushion alone or in aiding relationship with a mechanical spring is highly effective in obtaining ideal spring characteristics for the suspension. I have now found that, with a particular construction of a vehicular shock absorber, it is possible to take advantage of these characteristics of the gas cushion and improve the effectiveness thereof. Essentially, the present invention resides in the provision of a gas cushion formed by partitioning a relatively large-cross-section receptacle which has its liquid compartment in direct communication with the working chamber of the hydraulic dashpot whose piston and cylinder member damp oscillations of the suspension system and also perform a pumping action to displace hydraulic fluid in order to re-establish the predetermined level of the vehicle chassis.

Thus, the gas cushion of the present invention is formed in a hydraulic cylinder by a partition and has a cross-section larger than the cross-section of the working cylinder of the dashpot which is connected therewith. It has been found to be of a particular advantage to provide the gas cushion in a cup-shaped receptacle secured to the dashpot cylinder and at least partly surrounding a lower portion of the working chamber thereof so as to form with the working cylinder an axially extending annular clearance into which an axially extending outer flange of the partition extends so as to increase the volume of the gas cushion while maintaining a compact configuration for the dashpot assembly.

According to a further feature of this invention, the receptacle forming the gas cushion is provided with a plunger extending upwardly from the bottom thereof and forming one of the pump members by means of which the level of the chassis is restored, as will be apparent hereinafter. In accordance with this aspect of the invention, the other member of the pump is the piston which has an axially extending bore in which the plunger can be received for displacement of hydraulic fluid from a reservoir below the gas cushion into the working chamber of the dashpot. The efflux of fluid from the working chamber is controlled by means of a valve whose stem passes axially through the piston and the plunger to control a passage below the latter by means of which fluid can pass through the tubular plunger to the reservoir when the stem is retracted. The valve is maintained in a closed position, when the piston is at its predetermined normal location with respect to the cylinder, by a spring received in the interior of the shank of the piston which is formed with abutment means engageable with the stem upon elongation of the dashpot assembly to retract the valve and permit the escape of fluid from the working chamber until the predetermined level is re-established. A spring-loaded throttle valve is formed at this passage to delay the escape of hydraulic fluid during the efflux thereof to reduce the rate at which the level of the chassis settles upon removal of the load.

The above and other objects, features and advantages of the present invention will become more readily apparent from the following description, reference being made to the accompanying drawing in which the sole figure is an axial cross-sectional view through a hydraulic shock absorber according to the invention.

In the drawing, I show a shock aborber in its predetermined "normal" condition wherein the piston and cylinder of the hydraulic dashpot can deviate from their normal relative position but are restored thereto, especially upon changes in the load on the vehicle chassis, by a pumping action arising from normal oscillations. The shock absorber thus comprises a lug 1 by means of which the upper end of the shock absorber can be affixed to a vehicle chassis, this lug 1 having a threaded portion 1' received in a piston shank 3 and clamping, via a shoulder 1", a downwardly open cylindrical sleeve 2 against this shank. The shank 3 is hollow and receives a coil spring 4 which is seated against the threaded portion of the lug 1 at the upper end of the shank and bears against a valve stem 24 via a shoulder 7 which forms an abutment cooperating with a piston member 8 to which the shank 4 is threadedly secured. The cup 2 prevents dirt and other contaminating agents from entering the hydraulic shock absorber and co-operates with a double-action seal 5 of an elastomeric material such as rubber whose outer lip sealingly engages the inner wall of cup 2 and whose inner lip slidably engages the outer surface of the piston shank 3. The rubber seal 5 also constitutes a bumper or abutment whose surface 5' is engageable with the bottom 2' of the cup 2 to define the maximum inwardly telescoping stroke A of the shock absorber and this bumper is thus carried by the cover ring 6' of the hydraulic cylinder 16 which forms the dashpot with the head 13 of the piston. A seal 6 is provided in the cover ring 6' and engages the outer wall of piston shank 3 to limit the leakage of hydraulic fluid from the cylinder bore, any leakage oil passing over the ring 6' into a compartment 6" formed thereby and thence via a return tube 14 to the fluid reservoir 18. The latter is formed as an upwardly open cup and is integral with a connecting eye or lug 26 by means of which the lower portion of the shock absorber is affixed to the wheel axle of the vehicle.

The cup 18 is secured to a transverse flange 16' of the cylinder 16 by a threaded connection or other non-yieldable connecing means. The dashpot, as previously mentioned, is formed by the head 13 of the piston which is slidable within the working chamber 10 of the cylinder 16 and is provided with throttle bores 12 connecting both sides of the piston to damp oscillations thereof relative to the cylinder 16.

The cylinder 16 opens directly into a large-diameter receptacle 15 formed by a pot-shaped upwardly concave inner chamber 29 whose cylindrical walls extend parallel to the cylinder 16 and the axis of piston head 13 and are slidably engaged by a partition 19 extending across the interior of the inner cup 29 so as to subdivide it into a liquid compartment 15 and a gas cushion 21. An inner seal 20 of the partition 19 surrounds an axially extending plunger 23 which forms with a bore 11 of the piston an automatically operable pump designed to generate the fluid displacement necessary for the reestablishment of the predetermined normal relative position of the piston and cylinder and, therefore, the predetermined desired chassis height or level. The plunger 22 has a central bore 23 receiving the valve stem 24 with annular clearance and communicating with a chamber 23' at a valve 24' for controlling the escape of fluid from the working chamber 10 of hydraulic cylinder 16 through a passage 27'. The latter is also provided with a throttle valve 27 of conical configuration urged by a spring 28 into blocking of the passage 27' but yieldable under fluid pressure to permit fluid to discharge from the working chamber 10 to the reservoir 18 under certain conditions which will be apparent hereinafter. A shoulder 8' of the piston member 8 is engageable with the surface 30 of the cover ring 6' to form a stop limiting the maximum elongation of the assembly to the distance B. A pair of check valves 25 and 9 are designed to permit a substantially unidirectional pumping of hydraulic fluid by the plunger 22 from the reservoir 18 to the working chamber 10 in order to reestablish the predetermined chassis level upon a loading of the vehicle above its normal capacity.

Upon the loading of the vehicle, the occurrence of an upward jolt or the application to the chassis of an excessive downward force, the parts of the shock absorber are telescoped axially inwardly from the normal position of the assembly shown in the drawing to a maximum distance A, whereupon the piston head 13 is shifted downwardly with respect to the cylinder assembly 16 and hydraulic fluid is forced into the compartment 15 to displace the partition 19 downwardly and compress the gas cushion 21. Upon a relieving of the shock absorber, corresponding to the removal of a load from the vehicle chassis, the jacking up of the chassis, the passage of the wheel over a recess in the road surface or the like, the shock absorber is elongated through a maximum distance represented at B whereupon the piston 3, 8, 13 rises within the cylinder 16. It will be apparent that the gas cushion 21 thus serves not only to equalize the volume of hydraulic medium displaced by the piston 3, 8, 13, but also as a gas spring whose upward force acts in aiding relationship with the leveling or height-adjusting mechanism which urges the chassis upwardly upon a loading of the vehicle to telescope the shock absorber beyond its predetermined normal condition.

In order to improve the effectiveness of this gas spring, the working surface of the partition 19 has a substantially larger effective area than the cross-section of the working chamber 10 of the dashpot. This is ensured by having the gas cushion formed within the large-diameter upwardly open cup 29 by the partition 19 whose outer end extends axially into the space 15 between the lower portion of the working cylinder 16 and the cylindrical walls of the cup 29. Thus, the partition 19 is generally pot-shaped, as shown in the drawing. As the piston 3, 8, 13 moves through the distance A, the gas cushion is compressed by displacement of the partition 19 through the distance $a$ from its normal position, illustrated in the drawing, whereas movement of the piston 3, 8, 13 with respect to the working cylinder 16 through the distance B leads to a displacement of the partition in the corresponding direction through the axial length $b$. Because of the undulating configuration of the partition 19, a pair of annular spaces is provided which has been found to be important in the maintenance of the ideal spring characteristics of the gas cushion as an auxiliary suspension spring.

When the level of the chassis falls below the predetermined relative position corresponding to the illustrated locations of the piston and the cylinder because of additional loading of the chassis, for example, the piston 3, 8, 13 is forced below its normal position to compress the gas cushion while the normal oscillations of the plunger 22 in the passage 11 produce a pumping action by means of which hydraulic fluid is drawn through the check valve 25 from the reservoir 18 into the interior 23 of the plunger 22 and forced into the working chamber 10 via the check valve 9 to restore the piston to its normal position.

When, conversely, the operation of the device results in the piston 3, 8, 13 rising above its normal position (illustrated in the drawing), the surface 8" lifts the shoulder 7 and the stem 24 and entrains the latter away from the passage 24' to open the valve and permit fluid to drain to the reservoir 18 from the working chamber. The piston 3, 8, 13 then sinks until the spring 4 closes the valve 24'. The efflux rate is determined by the loading of the throttle-valve member 27 by the spring 28 to delay the lowering of the level of the chassis in accordance with the type of vehicle involved. The spring 28 is, however, so dimensioned that the throttle member 27 functions as such only in the region of movement C but blocks the passage 27' in the range of movement D, in which the liquid in space 10 is under reduced pressure, to prevent draining of the working chamber in a fully extended condition of the dashpot.

The system described and illustrated is believed to admit of many modifications within the ability of persons skilled in the art, all such modifications being considered included within the spirit and scope of the invention except as otherwise limited in the appended claims.

I claim:

1. A hydraulic shock absorber for vehicular suspension systems and the like having two relatively movable parts whose relative movement is to be damped, said shock absorber comprising:

a piston member connectable with one of said parts and a cylinder member connectable with the other of said parts and telescopingly receiving said piston member for forming a hydraulic dashpot having a working chamber;

wall means surrounding at least a lower end of said cylinder member and secured thereto while communicating with said chamber and having an effective cross-sectional area larger than that of said chamber; and a partition sealingly engaging said wall means for defining therewith a gas cushion subjected to hydraulic pressure from said chamber for resisting contraction of said dashpot, said wall means being a cup surrounding said lower end of said cylinder member with annular clearance, said partition having an axially extending outer portion sealingly slidable along an inner wall of said cup and extending into said annular clearance.

2. A shock absorber as defined in claim 1, further comprising a reservoir for hydraulic fluid connectable with said chamber and pump means connected with said members and operable upon relative movement thereof for displacing hydraulic fluid from said reservoir into said chamber to re-establish a predetermined normal spacing of said parts upon deviation from said normal spacing, said pump means including a plunger extending axially upwardly from the bottom of said cup and co-operating with said piston member, said partition surrounding said plunger and sealingly engaging same.

3. A shock absorber as defined in claim 2 wherein said plunger is tubular and said cup is formed below said plunger with a passage establishing communication between said chamber via the interior of said plunger and said reservoir for permitting the flow of fluid from said chamber to said reservoir, said shock absorber further comprising valve means for controlling the flow of fluid through said passage.

4. A shock absorber as defined in claim 3 wherein said valve means includes a valve stem axially extending through said plunger and said piston member and co-operating with said passage, said stem being engageable by said piston member upon elongation of said dashpot beyond the predetermined relative position of said members for permitting fluid to pass from said working chamber into said reservoir, and spring means in said piston member bearing upon said valve stem for urging same into blocking relationship with said passage upon contraction of said dashpot beyond said predetermined relative position of said members.

5. A shock absorber as defined in claim 4 wherein said passage is provided with a spring-loaded throttle valve for restricting the rate of flow through said passage upon the unblocking thereof by said valve means.

References Cited

UNITED STATES PATENTS 3,033,556   5/1962   Wossner.

ARTHUR L. LA POINT, *Primary Examiner.*

R. M. WOHLFARTH, *Assistant Examiner.*